United States Patent
Goodman et al.

(10) Patent No.: US 10,120,617 B2
(45) Date of Patent: Nov. 6, 2018

(54) USING DETERMINISTIC LOGICAL UNIT NUMBERS TO DYNAMICALLY MAP DATA VOLUMES

(71) Applicant: INTERNATIONAL BUSINESS MACHINES CORPORATION, Armonk, NY (US)

(72) Inventors: Daniel I. Goodman, Beit Shemesh (IL); Ran Harel, Kfar-Saba (IL); Oren S. Li-On, Ramat-Gan (IL); Rivka M. Matosevich, Zicron-Ya'acov (IL); Orit Nissan-Messing, Hod HaSharon (IL); Yossi Siles, Tel-Mond (IL); Eliyahu Weissbrem, Rehovot (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 175 days.

(21) Appl. No.: 14/077,997

(22) Filed: Nov. 12, 2013

(65) Prior Publication Data
US 2015/0134901 A1 May 14, 2015

(51) Int. Cl.
*G06F 3/06* (2006.01)

(52) U.S. Cl.
CPC .......... *G06F 3/0689* (2013.01); *G06F 3/0605* (2013.01); *G06F 3/067* (2013.01); *G06F 3/0611* (2013.01); *G06F 3/0632* (2013.01); *G06F 3/0665* (2013.01); *G06F 2003/0697* (2013.01)

(58) Field of Classification Search
None
See application file for complete search history.

(56) References Cited

U.S. PATENT DOCUMENTS

| 6,131,148 A | 10/2000 | West et al. |
|---|---|---|
| 6,253,295 B1 | 6/2001 | Beal et al. |
| 6,446,176 B1 | 9/2002 | West et al. |

(Continued)

OTHER PUBLICATIONS

M. Bellare and P. Rogaway, "Introduction to Modern Cryptography Course Notes, Chapter 6 Hash Functions", University of San Diego, p. 1, "https://cseweb.ucsd.edu/~mihir/cse207/w-hash.pdf".*

(Continued)

*Primary Examiner* — Sean D Rossiter
*Assistant Examiner* — Stephanie Wu
(74) *Attorney, Agent, or Firm* — Griffiths & Seaton PLLC (57) ABSTRACT

Methods, apparatus and computer program products implement embodiments of the present invention that include storing one or more data volumes to a small computer system interface storage device, and receiving a request to map a given data volume to a host computer. One or more attributes of the given data volume are identified, and using the identified one or more attributes, a unique logical unit number (LUN) for the given data volume is generated. The given data volume is mapped to the host computer via the unique LUN. In some embodiments, the generated LUN includes one of the one or more attributes. In additional embodiments, the generated LUN includes a result of a hash function using the one or more attributes. In storage virtualization environments, the data volume may include secondary logical units, and mapping the given data volume to the host may include binding the SLU to the host.

14 Claims, 5 Drawing Sheets

(56) References Cited

U.S. PATENT DOCUMENTS

| | | |
|---|---|---|
| 7,065,616 B2 | 6/2006 | Gajjar et al. |
| 7,089,381 B2 | 8/2006 | Horn et al. |
| 7,181,477 B2 | 2/2007 | Saika et al. |
| 7,376,786 B2 | 5/2008 | Williams |
| 7,657,613 B1 | 2/2010 | Hanson et al. |
| 7,797,468 B2 | 9/2010 | Shin et al. |
| 7,945,640 B1 | 5/2011 | Vantine |
| 8,341,119 B1 | 12/2012 | Roussos et al. |
| 8,402,118 B2 | 3/2013 | Finnegan et al. |
| 8,478,845 B2 | 7/2013 | Agarwala et al. |
| 8,914,327 B2 | 12/2014 | Hornkvist |
| 2004/0205300 A1* | 10/2004 | Bearden ............. 711/137 |
| 2004/0250033 A1 | 12/2004 | Prahlad et al. |
| 2005/0010731 A1 | 1/2005 | Zalewski et al. |
| 2005/0138312 A1 | 6/2005 | Kubo et al. |
| 2007/0011137 A1 | 1/2007 | Kodama |
| 2007/0106709 A1 | 5/2007 | Augenstein et al. |
| 2007/0174669 A1 | 7/2007 | Ebata et al. |
| 2007/0233868 A1 | 10/2007 | Tyrell et al. |
| 2008/0034176 A1 | 2/2008 | Akutsu et al. |
| 2008/0313414 A1 | 12/2008 | Shackelford |
| 2009/0094500 A1* | 4/2009 | Swekel ............. 714/752 |
| 2009/0240880 A1 | 9/2009 | Kawaguchi |
| 2010/0138605 A1 | 6/2010 | Kazar et al. |
| 2010/0228798 A1* | 9/2010 | Kodama ......... G06F 17/30241 707/822 |
| 2010/0306467 A1 | 12/2010 | Pruthi et al. |
| 2010/0332748 A1 | 12/2010 | van der Goot et al. |
| 2011/0022642 A1 | 1/2011 | Demilo et al. |
| 2011/0131443 A1 | 6/2011 | Laor et al. |
| 2011/0191536 A1 | 8/2011 | Mizuno et al. |
| 2011/0208940 A1 | 8/2011 | Naganuma et al. |
| 2011/0252280 A1* | 10/2011 | Finnegan et al. ............. 714/42 |
| 2011/0258404 A1 | 10/2011 | Arakawa et al. |
| 2012/0059976 A1* | 3/2012 | Rosenband et al. ......... 711/103 |
| 2012/0096231 A1 | 4/2012 | Morishita et al. |
| 2012/0198073 A1 | 8/2012 | Srikanth et al. |
| 2012/0198190 A1 | 8/2012 | Hart et al. |
| 2012/0210087 A1 | 8/2012 | Sugimoto et al. |
| 2012/0246642 A1 | 9/2012 | Pafumi et al. |
| 2012/0284239 A1 | 11/2012 | Agarwala et al. |
| 2012/0331251 A1 | 12/2012 | Schnapp et al. |
| 2013/0007388 A1 | 1/2013 | Kito et al. |
| 2013/0036280 A1 | 2/2013 | Futawatari et al. |
| 2013/0054520 A1 | 2/2013 | Sampathkumar |
| 2013/0067164 A1 | 3/2013 | Velayudhan et al. |
| 2013/0067188 A1 | 3/2013 | Mehra et al. |
| 2013/0067464 A1 | 3/2013 | Shah |
| 2013/0111471 A1 | 5/2013 | Chandrasekaran |
| 2013/0117448 A1 | 5/2013 | Nahum et al. |
| 2013/0227552 A1* | 8/2013 | Reddin et al. .................. 718/1 |
| 2013/0246365 A1 | 9/2013 | Hornkvist |
| 2013/0246922 A1 | 9/2013 | Doerr et al. |
| 2013/0297899 A1 | 11/2013 | Kawaguchi |
| 2013/0311612 A1 | 11/2013 | Dickinson |
| 2013/0325824 A1 | 12/2013 | Shoens |
| 2013/0339643 A1 | 12/2013 | Tekade et al. |
| 2013/0339647 A1 | 12/2013 | Jindo et al. |
| 2014/0040580 A1 | 2/2014 | Kripalani |
| 2014/0068211 A1 | 3/2014 | Fiske et al. |
| 2014/0156956 A1 | 6/2014 | Ezra |
| 2015/0026141 A1 | 1/2015 | Blanco et al. |

OTHER PUBLICATIONS

Kang et al., Virtual Allocation: A Scheme for Flexible Storage Allocation, Oct. 13, 2014, 6 pages, Proceedings of the OASIS workshop in conjunction with ASPLOS, Association for Computing Machinery, Washington DC, Texas A&M University, Boston, MA.

A System and Method for Providing Meta-data Model Based Distributed Data, Feb. 3, 2012.

Method and System for Extracting Meta-data for Interactions over Collaborative Applications, Aug. 26, 2010.

Papazoglou et al., "Blueprinting the cloud." pp. 74-79, IEEE 15.6 (2011), Internet Computing.

* cited by examiner

USING DETERMINISTIC LOGICAL UNIT NUMBERS TO DYNAMICALLY MAP DATA VOLUMES

FIELD OF THE INVENTION

The present invention relates generally to data storage, and specifically to deterministically generate logical unit numbers (LUNs) in order to dynamically map data volumes to a host computer.

BACKGROUND

In computer storage arrays (also referred to herein as storage systems or storage subsystems), disk partitioning and logical volume management are used to manage physical storage devices such as hard disk drives. In disk partitioning, a single storage device is divided into multiple logical storage units referred to as partitions, thereby treating one physical storage device as if it were multiple disks. Logical volume management provides a method of allocating space on mass-storage devices that is more flexible than conventional partitioning schemes. In particular, a volume manager can concatenate, stripe together or otherwise combine regions (a region is a sequence of bytes having a specific length, typically one megabyte) into larger virtual regions that administrators can re-size or move, potentially without interrupting system use.

Small Computer System Interface (SCSI) based storage systems that include storage devices such as SCSI storage devices, Internet Small Computer System Interface (iSCSI) storage devices and Fibre Channel storage devices, typically partition their storage devices into logically addressed portions that can be accessed by host computers. Each of these partitions is called a Logical Unit Number (LUN). LUNs can be regarded as logical drives or "soft partitions", and can be provisioned by a command issued by management software executing on the storage system. When provisioning storage resources, the management software can create, for example, more than one LUN from one physical storage devices, which would then appear as two or more discrete storage devices to a user. Alternatively, the management software may create a number of LUNs that span several separate storage devices that form a redundant array of independent disks (RAID) array that can appear as discrete storage devices to the user.

The description above is presented as a general overview of related art in this field and should not be construed as an admission that any of the information it contains constitutes prior art against the present patent application.

SUMMARY

There is provided, in accordance with an embodiment of the present invention a storage system, including a storage device configured to store one or more data volumes, and a processor configured to receive a request to map a given data volume stored on the storage device to a host computer networked to the storage system, to identify one or more attributes of the given data volume, to generate, using the identified one or more attributes, a unique logical unit number (LUN) for the data volume, and to map the given data volume to the host computer via the unique LUN.

There is also provided, in accordance with an embodiment of the present invention a method, including storing one or more data volumes to a storage device, receiving, by a processor, a request to map a given data volume to a host computer, identifying one or more attributes of the given data volume, generating, using the identified one or more attributes, a unique logical unit number (LUN) for the given data volume, and mapping the given data volume to the host computer via the unique LUN.

There is further provided, in accordance with an embodiment of the present invention a storage system, including a storage device configured to store a first multiple of data volumes, a memory, and a processor configured to define, in the memory, a data structure including a second multiple of entries, the second multiple being greater than or equal to the first multiple, to associate each of the data volumes of the storage device with a unique entry in the data structure so as to generate respective unique entries for the data volumes, to receive a request to store a value to one or more of the respective unique entries in the data structure, and to store the value to the one or more respective unique entries, thereby performing a mapping operation between a host computer networked to the storage system and the one or more of the data volumes associated with the one or more respective unique entries.

BRIEF DESCRIPTION OF THE DRAWINGS

The disclosure is herein described, by way of example only, with reference to the accompanying drawings, wherein.

DETAILED DESCRIPTION OF EMBODIMENTS

In a system comprising a storage array networked with one or more host computers, a data volume on the storage array can be mapped to a given host computer by assigning a logical unit number (LUN) to the data volume, thereby enabling the data volume to be accessed by the given host computer. Typically, applications executing on the given host computer can access a small set of data volumes on the storage array (also referred to herein as a storage controller), and this set of data volumes may not change very often. Therefore, the operation of mapping one or more data volumes to LUNs is typically carried out during an initial setup of the system and infrequently during the life of the system.

A recent trend in data storage is storage automation. Storage automation enables a storage array to encapsulate time consuming or repetitive tasks into a best practices policy that can be initiated on command or triggered via an event, with little or no human intervention. Storage automation can include (a) automated provisioning, (b) capacity on demand, (c) host transparent data movement, (d) hot spot elimination, (e) transparent data migration, (f) information life cycle management, and (g) utility storage. Among the issues confronting storage arrays implementing storage automation are concurrent mapping requests and maintaining consistent mapping.

An example of a concurrent mapping request comprises multiple external entities (e.g. two system administrators, multiple threads, or an administrator and a thread) attempting to concurrently create and map data volumes to a given host computer. LUN mapping typically does not implement any synchronization between requests such as "test and set". Thus, the process of mapping a data volume typically consists of retrieving a data volume mapping list in order to check if the data volume is already mapped to the given host computer ("test"), obtaining a free LUN, and then attempting to map the data volume at the obtained LUN ("set"). In the event of a concurrent request, the process described hereinabove may lead to device contention problems.

It can be advantageous that data volumes mapped to several host computers are mapped using an identical LUN for all the host computers. Consistent mapping ensures that data volumes can be mapped at the same LUN across all the host computers even if the data volumes are mapped by different entities. In order to handle concurrent mapping requests and to consistently map data volumes, embodiments of the present invention provide methods and systems for deterministically generating a LUN identifier based on a unique attribute of a data volume, so that the LUN identifier can be consistent across host computers and storage automation, thereby ensuring that there are no LUN collisions between two or more data volumes.

Embodiments of the present invention provide methods and systems for defining given LUN address space large enough so that a storage system wide volume attribute can be used for the LUN identifier. In some embodiments, a LUN identifier for a data volume can be generated by executing a hash algorithm based on one or more attributes of the volume, such as a creation time of the data volume.

In embodiments described hereinbelow, subsequent to storing one or more data volumes to a storage device, a request can be received to map a given data volume to a host computer. Upon receiving the request, one or more attributes of the given data volume can be identified, and using the identified one or more attributes, a unique logical unit number (LUN) can be generated for the given data volume. Using the generated LUN, the given data volume can then be mapped to the host computer.

By generating a deterministically generated LUN, embodiments of the present invention enable a data volume to have a consistent mapping, so that the data volume has the exact same LUN on all the host computers to which the data volume is mapped. Additionally, using a deterministically generated LUN also enables concurrent requests to achieve deterministic results without any thread coordination and regardless of the order of execution. A request to map a data volume to a host computer can be successfully processed by returning the same LUN identifier whether the volume was previously mapped or not, and regardless of any concurrent requests for this, or another data volume.

Given that SCSI based storage systems can support 24 bit and 40 bit LUN addresses, embodiments of the present invention enable the storage systems to implement consistent and unique mapping between data volume attributes that uniquely identify the volume, and valid LUN addresses. As described hereinbelow, additional benefits gained from using consistent LUN identifiers include, but are not limited to:

Enabling definition of a vectored mapping command and therefore allowing the mapping to be very dynamic.

Using consistent LUN identifiers in order to remove the need to query a mapping table before requesting the mapping, thereby making the mapping process more efficient.

Additionally, existing mappings can be stored in a one dimensional array (e.g., a bitmap) indexed by the consistent LUN identifier. The one dimensional array structure can be designed to be memory efficient and to enable extremely efficient operations to query or change the mapping state of any LUN/volume.

Furthermore, in embodiments of the present invention, any combination of volume attributes that uniquely identifies a given data volume within the storage array can be used as a source of the mapping. The mapping function can be designed to uniquely and consistently generate a LUN identifier that fits within the 24 bit or 40 bit SCSI LUN addressing. For example, a volume serial number that uniquely identifies the volume can be used as a mapping source, and the mapping function in this case can simply return the serial number as the LUN identifier.

In additional embodiments described hereinbelow, a storage device can be configured to store a first multiple of data volumes, and a data structure comprising a second multiple of entries can be defined in a memory, the second multiple being greater than or equal to the first multiple. Subsequent to defining the data structure, each of the data volumes of the storage device can be associated with a unique entry in the data structure so as to generate respective unique entries for the data volumes. Upon receiving a request to store a value to one or more of the respective unique entries in the data structure, the received value can be stored to the one or more respective unique entries, thereby performing a mapping operation between a host computer networked to the storage system and the one or more of the data volumes associated with the one or more respective unique entries.

Figure 1:
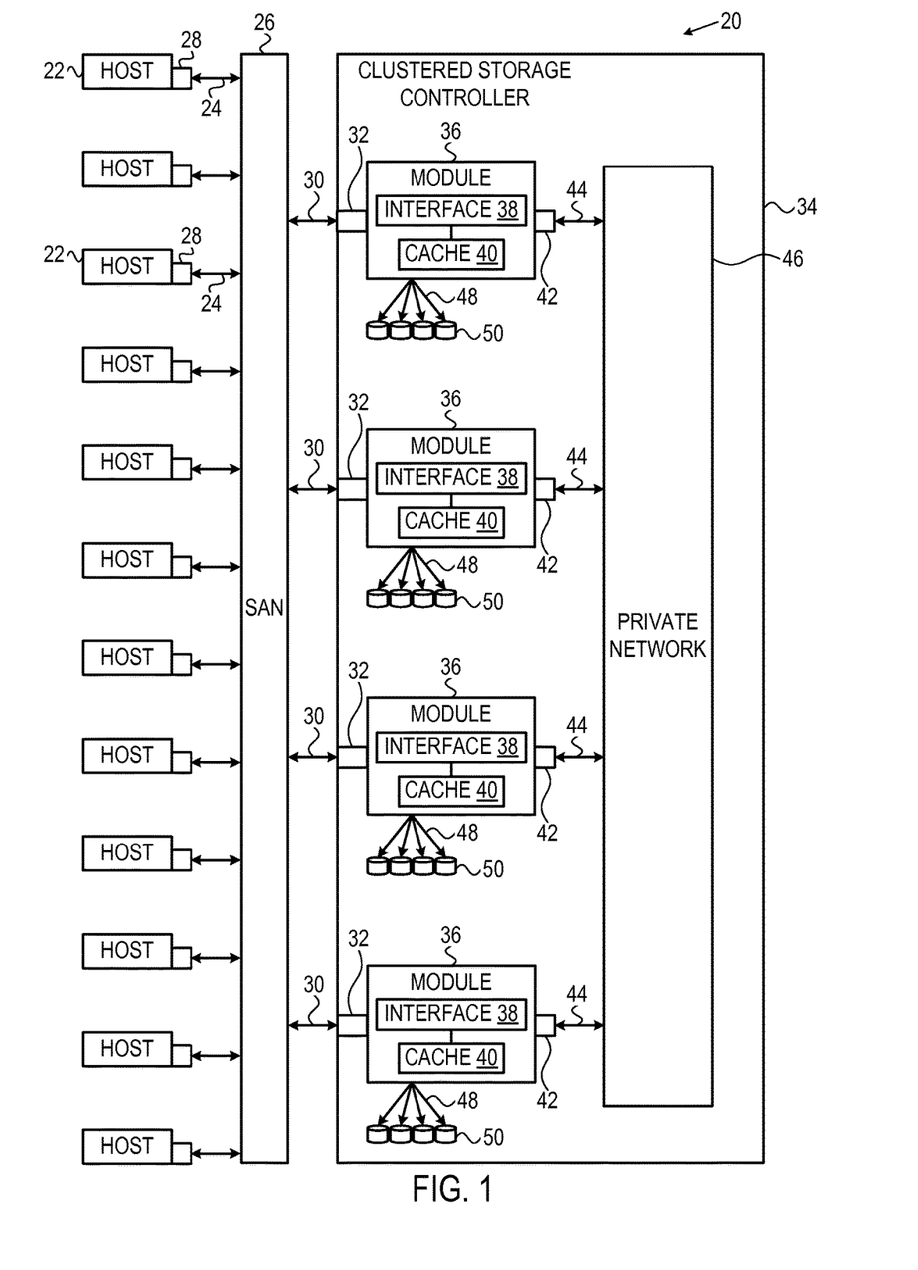
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on data volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a data volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a data volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs) or an InfiniBand™ fabric. Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, each of the logical storage devices may be referred to as a logical unit, and when made accessible by a given host computer 22, a logical unit number (LUN). While each LUN can be addressed as a single logical unit, the LUN may comprise a combination of high capacity hard disk drives and/or solid state disk drives.

Deterministic LUN Identifiers

Figure 2:
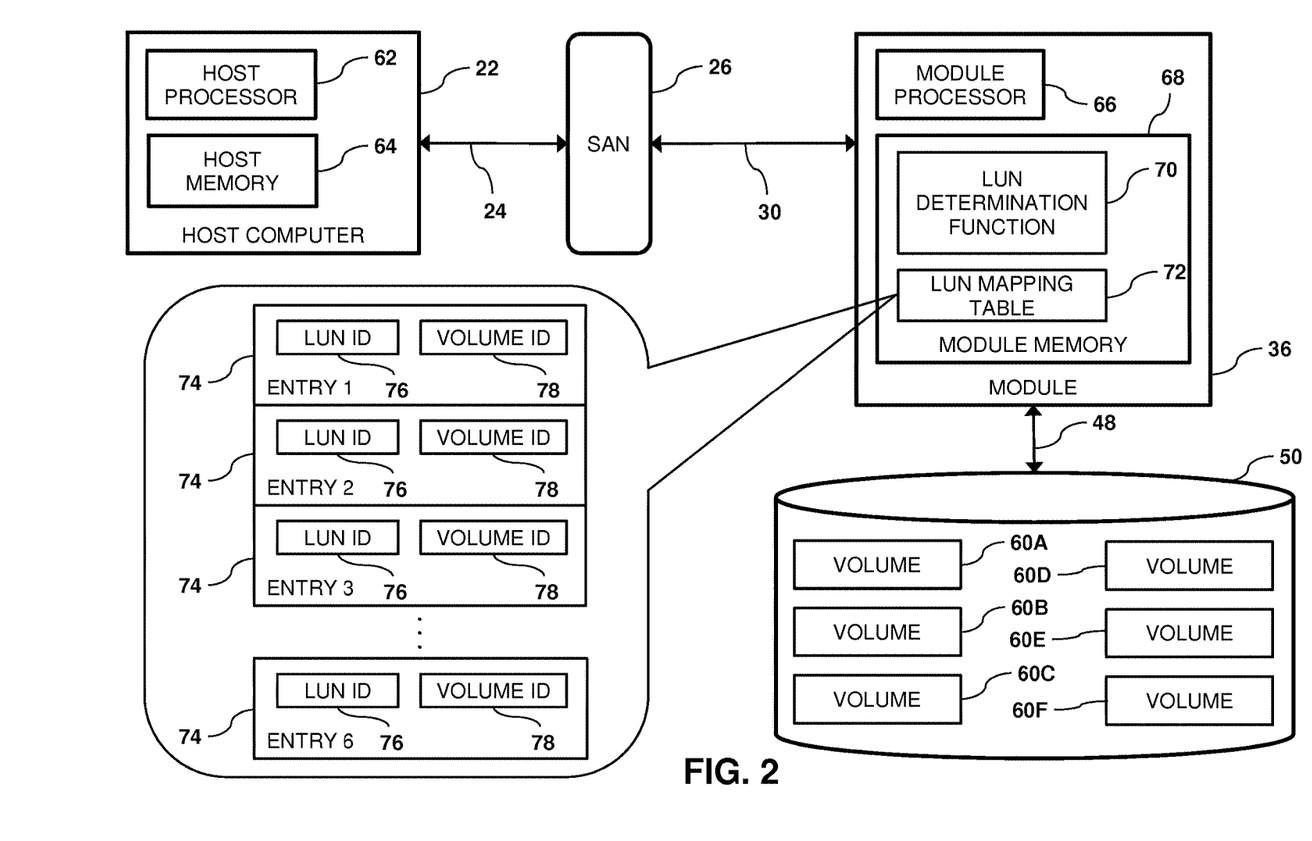
FIG. 2 is a block diagram of a module of the storage system configured to generate deterministic logical unit numbers (LUNs), in accordance with a first embodiment of the present invention.

FIG. 2 is a block diagram of first embodiment of a given module 36 that is configured to deterministically generate logical unit numbers (LUNs) to map one or more data volumes 60 to a given host computer 22, in accordance with a first embodiment of the present invention. In the example shown in FIG. 2, data volumes 60 are stored on a given storage device 50, and may be differentiated by appending a letter to the identifying numeral, so that the data volumes comprise data volumes 60A-60D. While the configuration in FIG. 2 shows data volumes 60 stored on a single storage device 50, each of the data volumes may be stored on any storage device 50. Additionally or alternatively, each of the data volumes may be spread over multiple storage devices 50.

Each host computer 22 comprises a host processor 62 and a host memory 64, and each module 36 comprises a module processor 66 and a module memory 68 configured to store a LUN determination function 70 and a LUN mapping table 72. Mapping table 72 comprises multiple entries 74, and each of the entries comprises a LUN identifier 76 and a volume identifier 78. In embodiments of the present invention, each data volume 60 can be associated with a unique value that can be stored in LUN identifier 76 when mapping a given volume 60 to host computer 22.

Upon receiving a request to map a given volume 60 to host computer 22, processor executes LUN determination function 70, whose operation is described in FIG. 3 hereinbelow, in order to generate the LUN associated with the given volume. While mapping the given volume to host computer 22, processor 62 can identify an available entry 74 in mapping table 72, and store, in the identified entry, an identifier (e.g., and volume name) for the given volume to volume identifier 78, and store the generated LUN to LUN identifier 76.

Processors 62 and 66 typically comprise general-purpose computers, which are programmed in software to carry out the functions described herein. The software may be downloaded to host computers 22 and modules 36 in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Python, Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
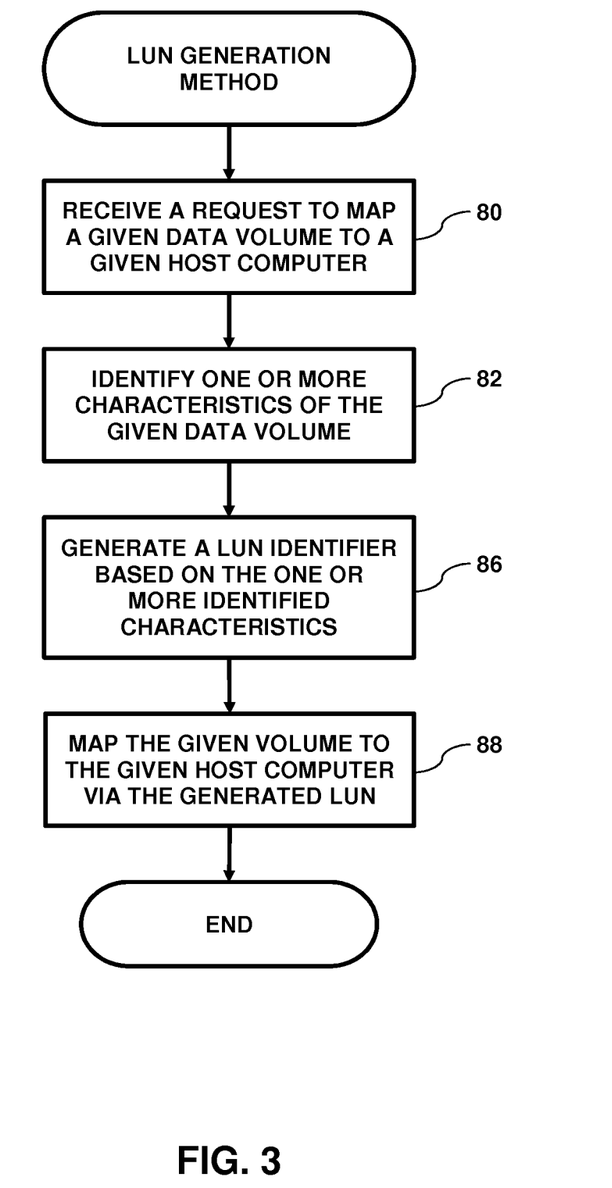
FIG. 3 is a flow diagram that schematically illustrates a method of generating deterministic logical unit numbers, in accordance with the first embodiment of the present invention.

FIG. 3 is a flow diagram that schematically illustrates a method of determining a LUN for a given volume 60, in accordance with the first embodiment of the present invention. As described supra, the steps described in the flow diagram shown in FIG. 3 can be implemented in LUN determination function 70.

In a receive step 80, module processor 66 receives a request to map a given volume 60 to host computer 22. In some embodiments, the request is received from host computer 22. Alternatively, the request can be received from a system administrator (not shown) via a system console (also not shown).

In an identification step 82, processor 66 identifies one or more attributes of the given volume. Examples of attributes include, but are not limited to, a creation date of the given volume, a volume identifier internally generated by processor 66, a volume identifier assigned by an external entity (e.g., a system administrator), and a size of the volume. In a generate step 84, processor 66 deterministically generates a LUN based on the one or more identified attributes.

In some embodiments, processor 66 can generate the LUN by calculating a hash function using any combination of the identified one or more attributes as an input to the hash function. In alternative embodiments, the generated number can be part of the given logical volume's identifier. For example, each volume 60 may have a unique three byte address where the first byte comprises a header and the last two bytes comprise a 16 bit volume number. In these alternative embodiments, in addition to indicating the given data volume's volume number, the 16 bit volume number can also indicate a unique LUN for the given volume.

In further embodiments, generating the unique LUN may comprise using one of the one or more attributes as the LUN. In other words, the generated LUN may comprise one of the one or more attributes. For the generated LUN may comprise a volume identifier internally generated by processor 66.

Finally, in a mapping step 86, processor 66 maps the given volume to host computer 22, and the method ends. As described supra, mapping the given volume to host computer 22 may comprise processor 66 identifying an available entry 74 in mapping table 72, and storing, in the available entry, an identifier (e.g., and volume name) for the given volume to volume identifier 78, and storing the generated LUN to LUN identifier 76. In embodiments where processor 66 executes a storage virtualization hypervisor, mapping the given volume to the host computer may comprise binding the given volume to host computer 22. Binding the given volume to host computer 22 is described in detail hereinbelow.

While LUNs in SCSI based storage systems originally an eight bit addressing scheme (i.e., LUN addresses 0-255), current SCSI systems may have LUN addresses comprising 24 bit or 40 bit values, thereby dramatically increasing the number of LUNs in the system. To provide backward compatibility, storage systems implementing 24 or 40 bit LUN addressing schemes can be configured to process legacy eight bit LUN addresses. Therefore, when an eight bit addressing scheme is used, storage processor 66 can create, for each host computer 22, a mapping table 72 whose entries 74 comprise LUN identifier 76 and volume identifier 78, so that each mapping in system 20 can be identified by a tuple of LUN identifier 76, volume identifier 78 and a given host computer 22. Alternatively, processor 66 can create, for each host computer 22 a vector of size 256 that may have a null entry for volume identifier 76.

In the eight bit addressing scheme, the format of the LUN address may comprise 0x00AA0000000000000000, where "AA" comprises an eight bit LUN address, and all bytes following the eight bit LUN address are ignored. When the array receives a SCSI command the logic can comprise:

```
Determine addressing scheme to be 8 bit
Determine host id
Find corresponding host mapping table
If lun ID (AA) not defined in mapping table
    Return invalid lun
Else:
    Look lun id and retrieve volume id
    Forward command to volume (volume_id)
```

To map a host to a volume, a system administrator can issue a command such as:

map_volume volume=volume host=host1 lun=27

The logic for the array can comprise:

```
Check volume exists else FAIL
If volume_id already in table:
    fail
if lun_id is not free:
    fail
Update table
```

In some embodiments, storage automation can to implement an algorithm such as:

```
List the current mapping list for host
If volume is already mapped
return LUN ID
else
    choose free slot/lun id
    execute the map command using lun_id
    if success:
        return LUN ID
    else:
        if retry count exceeded:
            return FAIL
        else
            {repeat map process}
```

In embodiments of the present invention, processor 66 can use a 24 bit addressing scheme, where a LUN address comprises 0x0Y00D200BBBB0000, where "Y" indicates an addressing scheme to be selected using the following logic:

```
If Y is 0
    {Use 8 bit scheme as before}
Else:
    read bytes 5,6
    (optional: confirm volume is bound to host)
    route command to volume (with volume id BBBB)
```

If system 20 uses a scheme where all volumes 60 are mapped to all host computers 22, then there may not be a need for to check to see if a given volume 60 is bound to a given host 22. However, for system 20 to support mapping a limited number of volumes 60 to a given host computer 22 where the given host computer cannot access a given volume 60 that is not explicitly mapped to the given host computer, then the additional step described supra of verifying the mapping may be required.

In some embodiments, as described hereinbelow in FIGS. 4 and 5, processor 66 can create a mapping bitmap for each host computer 22, so that if the system 20 supports 64K (i.e., 65,536) volumes 60 (i.e., addressable by a 16 bit volume address), then the mapping bitmap can have 64K corresponding entries. In a given mapping bitmap for a given host computer 22, a "0" can be stored at offset 5 in the given bitmap to indicate that a given volume 60 whose volume identifier 78 is "5" is not currently mapped to the given host computer. Likewise, a "1" can be stored at offset 5 in the given bitmap to indicate that the given volume is currently mapped to the given host computer.

When processing a LUN address in embodiments employing a bitmap, the logic may comprise a test such as: offset (a given volume identifier 78) is 1 or fail.

In some embodiments, a given host computer 22 may execute a hypervisor such as ESX™ or ESXi™, which are produced by VMware Inc., Palo Alto Calif., in order to implement storage virtualization, and enabling the given host computer to support hierarchical LUN addressing. In storage virtualization, volumes 60 may comprise virtual entities that may be referred to as secondary logical units (SLUs). In virtualized storage environments SLUs can be mapped to a given host computer 22 via a "binding" operation, as opposed to the mapping operation used in non-virtualized environments. While mapping a given volume 60 to a given host computer 22 establishes an operational relationship between the given volume and the given host computer, binding can be used in a storage virtualization environment to establish a relationship between an SLU LUN, an administrative logical unit (ALU) LUN and the given host computer. Therefore, when embodiments of the present invention are implemented in a storage virtualization environment, a mapping operation may comprise a binding operation, and an unmapping operation may comprise an unbinding operation.

In embodiments where storage system 20 implements storage virtualization, a vol_bind command can be used to bind a given volume 60 to a given host computer 20 where the given host computer does not specify a LUN for the given volume. In embodiments where one or more volumes 60 are bound to a given host computer 22, the volume identifier can will be used as the LUN, and the syntax of the command can be:

vol_bind vol=volumeA host=host1 which implements the logic:

Check volume exists else FAIL
Set the off set(volume_id) to 1

The vol_bind command described supra "binds" a given volume 60 to a given host computer 22. Advantages of binding a given volume 60 to a given host computer 22 include, but are not limited to:

Prior to binding the given volume to the given host computer, processor 66 may not need to perform a check in order to determine if the given volume is already bound to the given host computer.
The bind command is idempotent.
The result of the binding is deterministic.

In embodiments comprising a mapping bitmap, processor 66 can issue a vectored command such as:

vol_bind host=host1, vol=volA, volB, volC . . .

in order to bind one or more given volumes 60 to a given host computer 22 using logic described hereinabove. In some embodiments, storage automation can to implement binding using an algorithm such as:

vol_bind host=host1 vol=volume.volume_id

In operation, a small number of volumes 60 can be mapped to a given host computer 22, and mapping and unmapping operations are typically rare enough so that they can be managed by a system administrator. Virtualization and storage automation can break this concept by dramatically increasing both the number of volumes 60 and the number of mapping operations.

To accommodate this increase, host computers 22 and storage controller 34 can change their respective division of work and responsibilities during the mapping process. In embodiments of the present invention, instead of a given host computer 22 being a coordination point as is manifested by the given host computer determining a value of LUN identifier 76, storage controller 34 can now be the coordination point and set the LUN.

By enabling storage controller 34 to supply LUN identifier 76, additional benefits can be gained by making the LUNs deterministic. By making the LUNs of the volumes deterministic, any external entity that can identify attributes about a given logical volume 60 can then generate the LUN for the given volume. This was not possible previously in implementations where the LUN address space (eight bit) was smaller than the domain size (e.g., 64K volumes 60).

As described supra, LUN identifiers 76 may comprise be a hash of one or more volume attributes. For example, if CCCCCCCCCC is a 40 bit hash of a given volume's name, processor 66 can leverage the calculated in the 40 bit addressing format 0x0Y00E2CCCCCCCCCC. An alternative hash calculation may comprise using combinations such as a given host computer 22 and an attribute of the volume.

Utilizing a mapping bitmap can enable processor 66 to update mappings and unmappings more efficiently. While embodiments utilizing a mapping table typically have processor 66 updating one or more LUN mapping tables 72 in response receiving a summary of all the map and unmap operations, depending on the number of changes, updating a mapping bitmap may comprise simply replacing the original mapping bitmap with a replacement mapping bitmap. Alternatively, for small change sets, a vector of offsets (i.e., where we would apply a bitflip) can be applied to the mapping bitmap to effect the mapping changes.

The following are some efficiencies that can be realized by storage systems implementing embodiments of the present invention (specifically, generating deterministic LUNs, and replacing LUN mapping tables with mapping bitmaps):

Cloud storage automation can generate large amounts of management traffic, thereby increasing the frequency of mapping operations (that were typically from one to five operations per minute) to over 1,000 mapping operations per minute. Implementing mapping bitmaps can reduce the number of management commands that are sent for each of the volume mapping operations from between two and five operations to a single atomic operation. As a result of reducing the number of management commands needed to perform a given mapping operation, the system logic required to perform the mapping operations may be similarly reduced. Additionally, the amount of memory and processing resources required to maintain host mapping states may also be reduced.

By implementing mapping bitmaps in cloud computing implementations that assign multiple individual volumes 60 per virtual machine, the number of supported volumes in system 20 can be increased from between 500 and 1,000 to over 10,000.

Using a deterministic approach as described herein can minimize any damage from split-brain storage automation (i.e. when the cloud has failed over to the standby storage automation, but the old primary still considers itself active) and replay of commands when failing over from primary to a secondary storage automation without ever have the same volume bound to the host on different LUNs.

Mapping Bitmap

Figure 4:
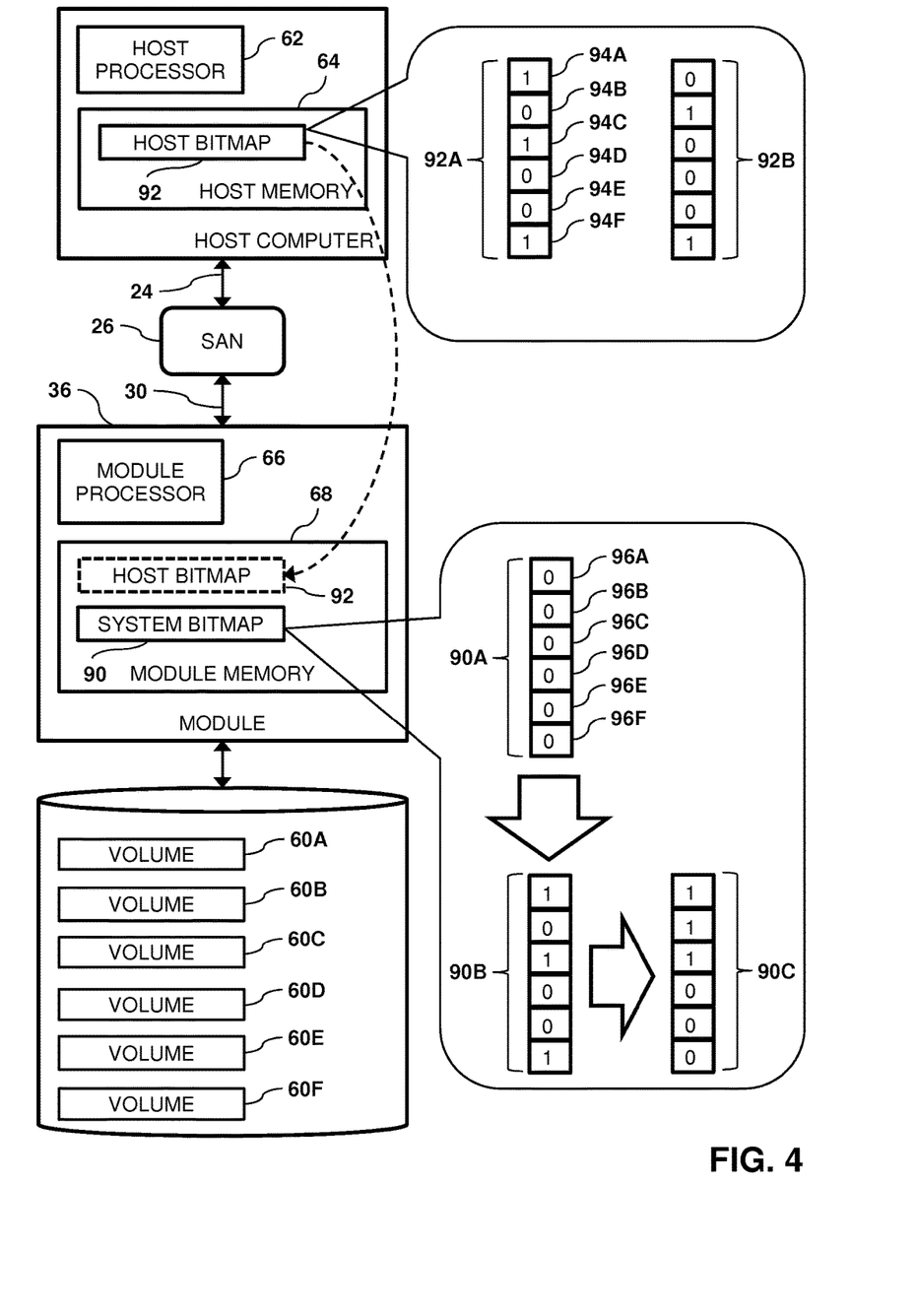
FIG. 4 is a block diagram of the module of the storage system configured to map one or more data volumes to a host computer using a mapping bitmap, in accordance with a second embodiment of the present invention.
Figure 5:
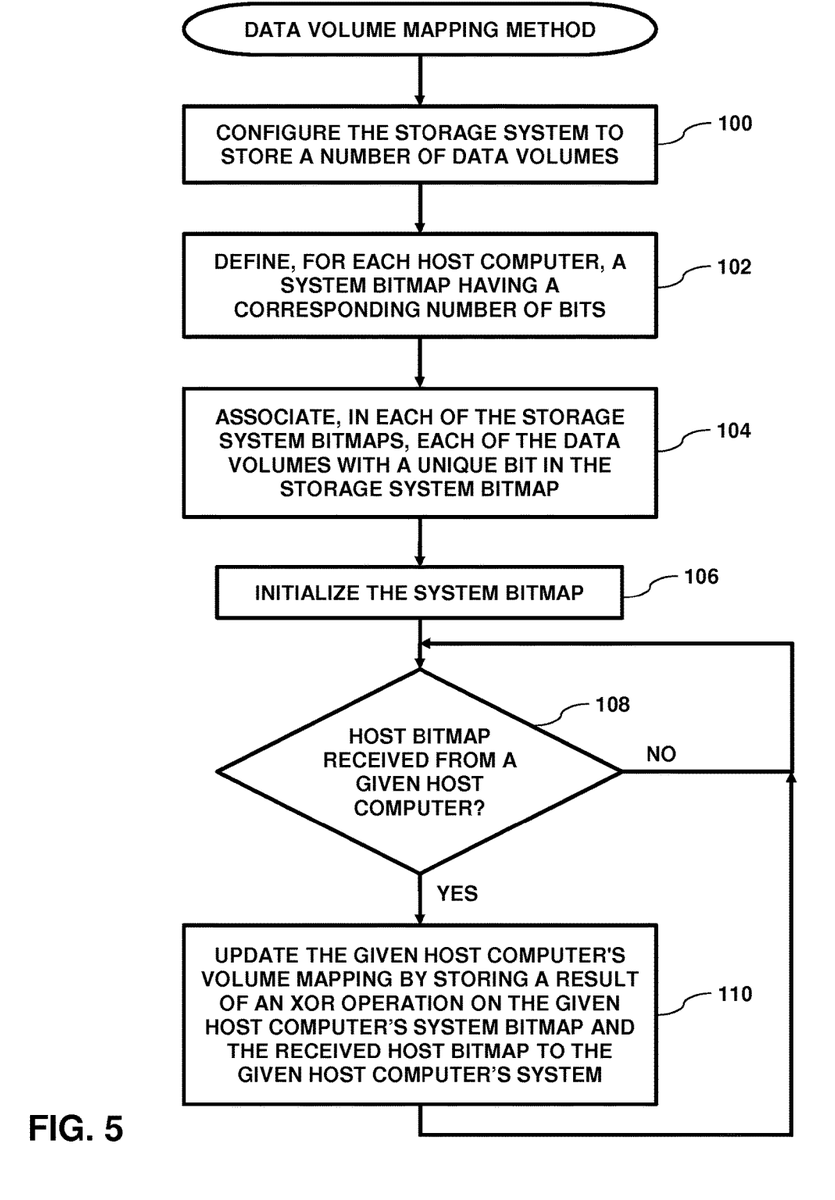
FIG. 5 is a flow diagram that schematically illustrates a method of using the mapping bitmap to map one or more of the data volumes to the host computer, in accordance with the second embodiment of the present invention.

FIG. 4 is a block diagram of a given module 36 configured to use a system bitmap 90 to map one or more data volumes 60 to a given host computer 22, and FIG. 5 is a flow diagram that schematically illustrates a method of using the system bitmap to map and unmap the data volumes from the given host computer in accordance with a second embodiment of the present invention. In addition to the system bitmap that is stored in module memory 64 of module 36, system 20 comprises a host bitmap 92 (whose functionality is explained hereinbelow) that is stored in host memory 64 of host computer 22.

The configuration in FIG. 4 shows three system bitmaps 90 that can be differentiated by appending a letter to the identifying numeral, so that the system bitmaps comprise system bitmaps 90A-90C. Likewise, the three host bitmaps 92 can be differentiated by appending a letter to the identifying numeral, so that the host bitmaps comprise host bitmaps 92A and 92B. As described hereinbelow, system bitmap 90A indicates an initial mapping status of volumes 60, system bitmap 90B indicates a first updated mapping status of volumes upon module 36 receiving and processing host bitmap 92A, and system bitmap 90C indicates a second updated mapping status of volumes 60 upon module 36 receiving and processing host bitmaps 92A and 92B.

Bitmap 90 comprises system bits 94, and bitmap 92 comprises host bits 96, and each of the system bits has a corresponding host bit. Bits 94 and 96 can be differentiated by appending a letter to the identifying numeral, so that system bits 94 comprise system bits 94A-94F and host bits 96 comprise host bits 96A-96F. While the configuration shown in FIG. 4 has a single system bitmap 90, memory 68 is configured to store a separate system bitmap for each host computer 22 interacting with storage controller 34.

In a configuration step 100, processor 66 configures storage controller 34 to store a first multiple of data volumes 60. In the example shown in FIG. 4, processor 66 configures six data volumes 60A-60F. In a definition step 112, processor 66 defines a data structure comprising a second multiple of entries, the second multiple being greater than or equal to the first multiple. In some embodiments, the data structure may comprise system bitmap 90 and the elements may comprise system bits 94, and processor 66 may define a separate system bitmap 90 for each host computer 22. In the example shown in FIG. 4, system bitmap 90 comprises six system bits 94.

In an association step 102, processor 66 associates each data volume 60 with a unique system bit 94 in system bitmap 90 so as to generate respective unique entries for the data volumes. In the configuration shown in FIG. 4, system bit 94A is associated with volume 60A, system bit 94B is associated with volume 60B, system bit 94C is associated with volume 60C, system bit 94D is associated with volume 60D, system bit 94E is associated with volume 60E, and system bit 94F is associated with volume 60F. In embodiments described herein, a first value (e.g., "1") stored in given system bit 94 indicates that a given volume 60 associated with the given system bit is mapped to host computer 22, and a second value (e.g., "0") stored in a given system bit 94 indicates that a given volume 60 associated with the given system bit is not mapped to host computer 22.

In an initialization step 104, processor 66 initializes system bits 94 in system bitmap 90A to indicate that there are no volumes 60 mapped to host computer 22. In the example shown in FIG. 4, processor 66 initializes system bitmap 90A to store "000000" to indicate the no volumes 60 are mapped to host computer 22.

In a comparison step 108, processor 66 waits to receive a given host bitmap 92 from host computer 22, and upon receiving a given host bitmap 92, processor 66 uses the received host bitmap to update system bitmap 90, thereby updating the mapping of volumes 60 to the host computer in an update step 110, and the method continues with step 108. In embodiments of the present invention, receiving the given host bitmap comprises receiving a request to store one or more values to one or more of the respective unique entries in the data structure (i.e., the system bits in the system bitmap), and updating system bitmap 90 comprises storing a value (e.g., "1" as described hereinbelow) to the one or more respective unique entries in order to perform a mapping operation between host computer 22 and one or more data volumes 60 that are associated with the one or more respective unique entries.

To update system bitmap 90, processor 66 can perform an exclusive disjunction operation (also known as an "exclusive or" or an XOR operation) on the received host bitmap with the system bitmap, and store a result of the exclusive disjunction operation to the system bitmap in order to map or unmap one or more volumes 60 to/from host computer 22. As described in initialization step 106, processor 66 can initialize system bitmap 90A with "000000" to indicate that no volumes 60 are mapped to host computer 22. In embodiments herein "0" may be referred to as an unmapped value and "1" may be referred to as a mapped value. Therefore, if a given system bit 94 stores the mapped value then the volume associated with the given system bit is currently mapped to host computer 22. Likewise, if the given system bit 94 stores the unmapped value then the volume associated with the given system bit is not currently mapped to host computer 22.

In the example shown in FIG. 4, upon receiving host bitmap 92A from host computer 22, processor 66 performs a first exclusive disjunction operation on host bitmap 92A ("101001") and system bitmap 90A ("000000") to generate updated system bitmap 90B ("101001"), thereby mapping volumes 60A, 60C and 60F to host computer 22. Continuing the example shown in FIG. 4, subsequent to receiving host bitmap 92A, processor 66 receives host bitmap 92B. Upon receiving host bitmap 92B from host computer 22, processor 66 performs a second exclusive disjunction operation on host bitmap 94B ("010011") and system bitmap 90A ("101001") to generate updated system bitmap 90B ("110010"), thereby unmapping volume 60F from host computer 22, mapping volume 60B to the host computer, and maintaining the mappings of volumes 60A and 60C to the host computer.

Therefore, using embodiments of the present invention, processor 66 can map and/or unmap one or more volumes 60 to/from host computer 22 in a single atomic operation.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A storage system, comprising:
   a storage device configured to store one or more data volumes; and
   a processor configured:
      to receive a request to map a given data volume stored on the storage device to a host computer networked to the storage system,
      to identify one or more attributes of the given data volume, to generate, using the identified one or more attributes, a unique logical unit number (LUN) for the data volume, and to map the given data volume to the host computer via the unique LUN such that the unique LUN is consistently mapped across the host computer in addition to multiple other host computers using the unique LUN, thereby handling concurrent mapping requests from the host computer and the multiple other host computers using the unique LUN to mitigate LUN collisions associated with the concurrent mapping requests, wherein the processor is configured to generate the LUN by calculating a hash function in lieu of abbreviating the one or more attributes, the hash function calculated using the one or more attributes; wherein each one of at least a creation date of the given volume, a size of the given volume, an identifier assigned externally by an administrator for the given volume, and an internally generated unique volume identifier are used as an input to the hash function.

2. The storage system according to claim 1, wherein the processor is configured to receive the request in response to the host computer conveying the request to the storage system.

3. The storage system according to claim 1, wherein the given data volume comprises a secondary logical unit (SLU), and wherein the processor is configured to map the given data volume to the host computer by binding the SLU to the host computer.

4. The storage system according to claim 1, wherein the generated LUN comprises one of the one or more attributes.

5. The storage system according to claim 1, wherein each of the storage devices is selected from a list consisting of a hard disk drive and a solid state drive.

6. A method, comprising:

storing one or more data volumes to a storage device;

receiving, by a processor, a request to map a given data volume to a host computer;

identifying one or more attributes of the given data volume;

generating, using the identified one or more attributes, a unique logical unit number (LUN) for the given data volume; and mapping the given data volume to the host computer via the unique LUN such that the unique LUN is consistently mapped across the host computer in addition to multiple other host computers using the unique LUN, thereby handling concurrent mapping requests from the host computer and the multiple other host computers using the unique LUN to mitigate LUN collisions associated with the concurrent mapping requests;

wherein generating the LUN comprises calculating a hash function in lieu of abbreviating the one or more attributes, the hash function calculated using the one or more attributes; wherein each one of at least a creation date of the given volume, a size of the given volume, an identifier assigned externally by an administrator for the given volume, and an internally generated unique volume identifier are used as an input to the hash function.

7. The method according to claim 6, wherein receiving the request comprises receiving the request from the host computer.

8. The method according to claim 6, wherein the given data volume comprises a secondary logical unit (SLU), and wherein mapping the given data volume to the host computer comprises binding the SLU to the host computer.

9. The method according to claim 6, wherein the generated LUN comprises one of the one or more attributes.

10. The method according to claim 6, wherein each of the storage devices is selected from a list consisting of a hard disk drive and a solid state drive.

11. A computer program product, the computer program product comprising:

a non-transitory computer readable storage medium having computer readable program code embodied therewith, the computer readable program code comprising:

computer readable program code configured to store one or more data volumes to a storage device;

computer readable program code configured to receive a request to map a given data volume to a host computer;

computer readable program code configured to identify one or more attributes of the given data volume;

computer readable program code configured to generate, using the identified one or more attributes, a unique logical unit number (LUN) for the given data volume; and computer readable program code configured to map the given data volume to the host computer via the unique LUN such that the unique LUN is consistently mapped across the host computer in addition to multiple other host computers using the unique LUN, thereby handling concurrent mapping requests from the host computer and the multiple other host computers using the unique LUN to mitigate LUN collisions associated with the concurrent mapping requests;

wherein the computer readable program code is configured to generate the LUN by calculating a hash function in lieu of abbreviating the one or more attributes, the hash function calculated using the one or more attributes; wherein each one of at least a creation date of the given volume, a size of the given volume, an identifier assigned externally by an administrator for the given volume, and an internally generated unique volume identifier are used as an input to the hash function.

12. The computer program product according to claim 11, wherein the computer readable program code is configured to receive the request by receiving the request from the host computer.

13. The computer program product according to claim 11, wherein the given data volume comprises a secondary logical unit (SLU), and wherein mapping the given data volume to the host computer comprises binding the SLU to the host computer.

14. The computer program product according to claim 11, wherein the generated LUN comprises one of the one or more attributes.

* * * * *